(12) United States Patent
Spence et al.

(10) Patent No.: US 11,586,834 B2
(45) Date of Patent: Feb. 21, 2023

(54) AUTOMATIC LOCALIZATION OF DYNAMIC CONTENT

(71) Applicant: Roblox Corporation, San Mateo, CA (US)

(72) Inventors: Kyle Spence, Redwood City, CA (US); Peter John Phillips, San Francisco, CA (US); Craig Collins, San Carlos, CA (US); Pengfei Gao, San Mateo, CA (US); Xiaochen Xu, Foster City, CA (US); Alex Quartulli, Branford, CT (US); Andrew Li, San Francisco, CA (US); Andrew Gilmore Francis, Saratoga, CA (US); Jovanni Antonio Cutigni, San Mateo, CA (US); Shreya Ramamurthy, Sunnyvale, CA (US)

(73) Assignee: Roblox Corporation, San Mateo, CA (US)

( * ) Notice: Subject to any disclaimer, the term of this patent is extended or adjusted under 35 U.S.C. 154(b) by 222 days.

(21) Appl. No.: 16/916,869

(22) Filed: Jun. 30, 2020

(65) Prior Publication Data
US 2021/0406481 A1 Dec. 30, 2021

(51) Int. Cl.
*G06F 40/58* (2020.01)
*A63F 13/87* (2014.01)
*A63F 13/79* (2014.01)
*G06F 40/30* (2020.01)
*G06F 40/263* (2020.01)

(52) U.S. Cl.
CPC .............. *G06F 40/58* (2020.01); *A63F 13/79* (2014.09); *A63F 13/87* (2014.09); *G06F 40/263* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 8,185,374 B2* | 5/2012 | Kong | G06F 40/58 704/7 |
| 10,803,256 B2* | 10/2020 | Lagunas | G06F 40/51 |
| 10,943,074 B2* | 3/2021 | Saeki | G06F 40/55 |
| 11,128,636 B1* | 9/2021 | Jorasch | G06F 3/015 |
| 11,307,838 B2* | 4/2022 | Burukhin | G06F 9/454 |
| 2006/0217654 A1* | 9/2006 | Matsumura | A61N 1/306 604/20 |
| 2016/0103826 A1* | 4/2016 | Lui | G06F 40/205 704/3 |
| 2019/0324999 A1 | 10/2019 | Alvarez et al. | |

OTHER PUBLICATIONS

International Search Report and Written Opinion in International Application No. PCT/US2021/39738, dated Sep. 16, 2021, 7 Pages.

* cited by examiner

*Primary Examiner* — Ronald Laneau
(74) *Attorney, Agent, or Firm* — IP Spring (57) ABSTRACT

Implementations described herein relate to methods, systems, and computer-readable media to localize dynamic content. In some implementations, a computer-implemented method includes receiving visual content associated with a game from a first client locale, the visual content including text being represented at the first client locale by a first language, converting the text to generate translated text in at least a second language associated with a second client locale, and storing the translated text in a database in association with the visual content.

23 Claims, 6 Drawing Sheets

AUTOMATIC LOCALIZATION OF DYNAMIC CONTENT

TECHNICAL FIELD

Embodiments relate generally to computer-based gaming, and more particularly, to methods, systems, and computer readable media for automatic localization of dynamic content.

BACKGROUND

Some online platforms (e.g. gaming platforms, media exchange platforms, etc.), allow users to connect with each other, interact with each other (e.g., within a game), create games, and share information with each other via the Internet. The online platforms may further provide gaming content. It follows that as gaming content is produced for a first region or locale, other regions or locales may desire similar or the same gaming content.

In order to provide gaming content to the other regions, game developers need to devote resources to translate the gaming content. As some online platforms further rely on user-generated content for a gaming experience, obtaining vetted translations of all content is difficult or unmanageable. Moreover, dynamic content driven by user interactions further complicates providing localized content to multiple regions or locales.

Some implementations were conceived in light of the above.

SUMMARY

According to an aspect, a computer-implemented method of automatic localization of dynamic content is provided. The method includes: receiving visual content associated with a game from a first client locale, the visual content including text being represented at the first client locale by a first language; converting the text to generate translated text in at least a second language associated with a second client locale; and storing the translated text in a database in association with the visual content.

In some implementations the method further includes receiving a request for the visual content from the second client locale; rendering localized content based on the second client locale, the rendered localized content including at least the translated text; and transmitting the rendered localized content to a client device in the second client locale responsive to the request.

In some implementations, the converting includes creating candidate database entries based on the text and the visual content; selecting a subset of the candidate database entries to obtain a pool of remaining database entries; evaluating entries in the pool of remaining database entries to generate an importance ranking; and filtering to remove one or more entries from the pool of remaining database entries that are associated with a respective importance ranking that does not meet a first importance threshold.

In some implementations, the first importance threshold is a value of importance of text being accurately represented at the second client locale.

In some implementations, the converting includes translating the text from the visual content into a plurality of languages, each language associated with a respective client locale, and wherein the storing comprises storing the translated text in the database, the stored translated text being associated with the respective client locale.

In some implementations, the stored translated text is configured to be rendered in localized content and transmitted to client devices in the plurality of languages.

In some implementations, the converting includes creating candidate database entries based on the text and the visual content; and selecting a subset of the candidate database based on context in which the text appears in the visual content.

In some implementations, selecting the subset of candidate database entries includes removing candidate database entries associated with an invalid source of the visual content.

In some implementations, the translated text is associated with an importance ranking value that meets a first importance threshold.

In some implementations, the importance ranking value is a measure of importance of translated text being accurately represented at the second client locale.

In some implementations, the importance ranking value is based on one or more of a number of users that view the visual content, a number of sessions associated with the visual content, or a source of the visual content.

In some implementations, the text is user-generated text provided by a user that accesses the game.

According to another aspect, a computer-implemented method of automatic localization of dynamic content is provided. The method includes: receiving visual content associated with a game from a first client locale, the visual content including text being represented at the first client locale by a first language; converting at least a portion of the text to generate translated text in a second language associated with a second client locale; storing the translated text in a database, the stored translated text being associated with the first client locale and a gaming change event; receiving a request for the visual content from a second client locale; rendering localized content based on the second client locale and the gaming change event, the rendered localized content including the translated text; and transmitting the rendered localized content to a client device at the second client locale.

In some implementations, converting the portion of the text includes converting a subset of the text that meets a threshold confidence value.

In some implementations, the converting includes creating a pool of candidate database entries; evaluating entries in the pool of candidate database entries to generate an engagement score; and filtering to remove one or more entries with engagement scores that does not meet a first threshold.

In some implementations, the engagement score is a measure of user interaction with the translated text.

In some implementations, the converting includes translating the portion of the text separately from the visual content.

In some implementations, the translated text is stored separately from the visual content.

In some implementations, the converting includes selecting a subset of candidate database entries prior to generating the translated text.

In some implementations, selecting the subset of candidate database entries includes removing candidate database entries associated with offensive content.

According to yet another aspect, a system includes: a memory with instructions stored thereon; and a processing device, coupled to the memory, the processing device configured to access the memory and execute the instructions. In some implementations, the instructions cause the processing device to perform operations including: receiving visual content associated with a game from a first client locale, the visual content including text being represented at the first client locale by a first language; converting at least a portion of the text to generate translated text in a second language associated with a second client locale; storing the translated text in a database, the stored translated text being associated with the first client locale and a gaming change event; receiving a request for the visual content from a second client locale; rendering localized content based on the second client locale and the gaming change event, the rendered localized content including the translated text; and transmitting the rendered localized content to a client device at the second client locale.

According to still another aspect, a non-transitory computer-readable medium with instructions stored thereon that, responsive to execution by a processing device, causes the processing device to perform operations including: receiving visual content associated with a game from a first client locale, the visual content including text being represented at the first client locale by a first language; converting the text to generate translated text in at least a second language associated with a second client locale; and storing the translated text in a database in association with the visual content.

In some implementations, the operations further include receiving a request for the visual content from the second client locale; rendering localized content based on the second client locale, the rendered localized content including at least the translated text; and transmitting the rendered localized content to a client device in the second client locale responsive to the request.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by one or more non-player characters (NPC) which may be computer-generated characters, e.g., when a single player is part of a game.

An online gaming platform may also allow users (developers) of the platform to create new games, characters, and content. For example, users of the online gaming platform may be enabled to create, design, and/or customize new characters, items, or other content, and make them available to other users.

New user content may be generated at a first region or locale associated with a particular online game. Region or locale may refer to a geographic region, e.g., a city, state, country, continent, etc. or geographic regions defined in other ways (e.g., by primary spoken language or dialect). Locale-specific customizations may exist in new user content. For example, American English spellings may be used in content generated by content creators within the U.S., while British English may be used in content generated by British content creators. Still further, other customizations, e.g., use of symbols, emojis, currency icons, or other text or non-text content items etc. may follow locale-specific cultural conventions. Locale-specific customizations may also apply to content such as dates (e.g., MM/DD/YY or DD-MM-YY), numbers (use of a comma instead of a decimal point), or other content. If the game is to be accessed or played in a separate region, the new content typically exists only in the originating language and with localization specific to the source location. For example, in a game in which the game objective is to build a pizza shop and sell items, the prices of items may be displayed with a $ sign, e.g., $5.50, in the game content, which may be unsuitable for game players that play the game from other locations that may use other currency symbols.

Gaming content may similarly be generated for a first region or locale. Thus, if the game is to be accessed or played in a separate region, the gaming content typically exists in the originating localization unless otherwise translated by a game developer, or other party.

An objective of the game platform owner or administrator may include the localization of the new user content, the gaming content, and any dynamic content associated with a game. A technical problem for game platform operators is to provide translations of game content, including dynamic content, associated with the game platform, which can help players in locales for which game content is not available play and enjoy the game.

Online game platforms can be massive and include a plurality of dynamic content that changes over time, and a user base that generates new user content rapidly, as well. A game platform that accurately translates or otherwise localizes dynamic content can therefore effectively localize virtually any game without traditional drawbacks.

For example, in conventional localization, a game platform operator needs to engage in manual translations based on static content for deployment after a translation delay. The initial translation delay may include vetting, quality control, and other measures to ensure appropriate content is distributed via media to additional locales. However, online game platforms constantly produce new content, rendering traditional approaches difficult or impossible to employ.

Another approach is to use automated translation services, e.g., translation APIs, that can provide translations. An important limitation of such services is that these services often fail to provide accurate or usable translations in the context of game content. For example, game platforms and games played on those platforms often includes text content that is not included in dictionaries or standard language texts. Such text content can include, e.g., game or platform specific slang, nouns, and other terms.

Other limitations relate to a lack of child safety or child-appropriate-content when generating translations. For example, inappropriate translations can often result from common items such as the phrase "treasure chest" in an American English region being translated to "treasure boob" in a Korean region. Furthermore, some content providers may have platform-specific jargon or slang that is often difficult to translate appropriately using conventional approaches. For example, slang terms such as "obby" for an obstacle course; "gg" to express a good game; "OD'er" to identify an online dater; "admin" to represent a game owner or administrator; and other common slang terms may be mistranslated, not translated, or translated using words that are inappropriate for the users. The domain-specific nature of such text causes the translation service to fail to provide a translation or to provide a poor or unusable translation.

The present disclosure addresses the above-described drawbacks by providing a novel system architecture and methods that process and convert gaming content to new locales nearly as quickly as the content is created. Gaming content may be parsed, localized, and stored for deployment to virtually any locale such that users accessing a game from multiple locales may be provided dynamic content that is localized without waiting for a new release associated particularly with their respective locale. This allows for multiple users of a same game to see gaming content in their respective languages. It follows that multiple users of the same game may also play simultaneously in different languages, e.g., participate in a same game session or game environment and view the same visual content tailored based on their locale.

The system architecture may also allow game developers to obtain translated content, utilize a translation service (e.g., provided by the game platform) to translate content, manipulate previously translated content, direct high priority content to be translated at a different rate than other content, and otherwise ensure quality and timeliness of availability of translated content for their game. Through intelligent parsing and storage of translation tables, rapid localization can be achieved while ensuring a high quality online game experience.

Figure 1:
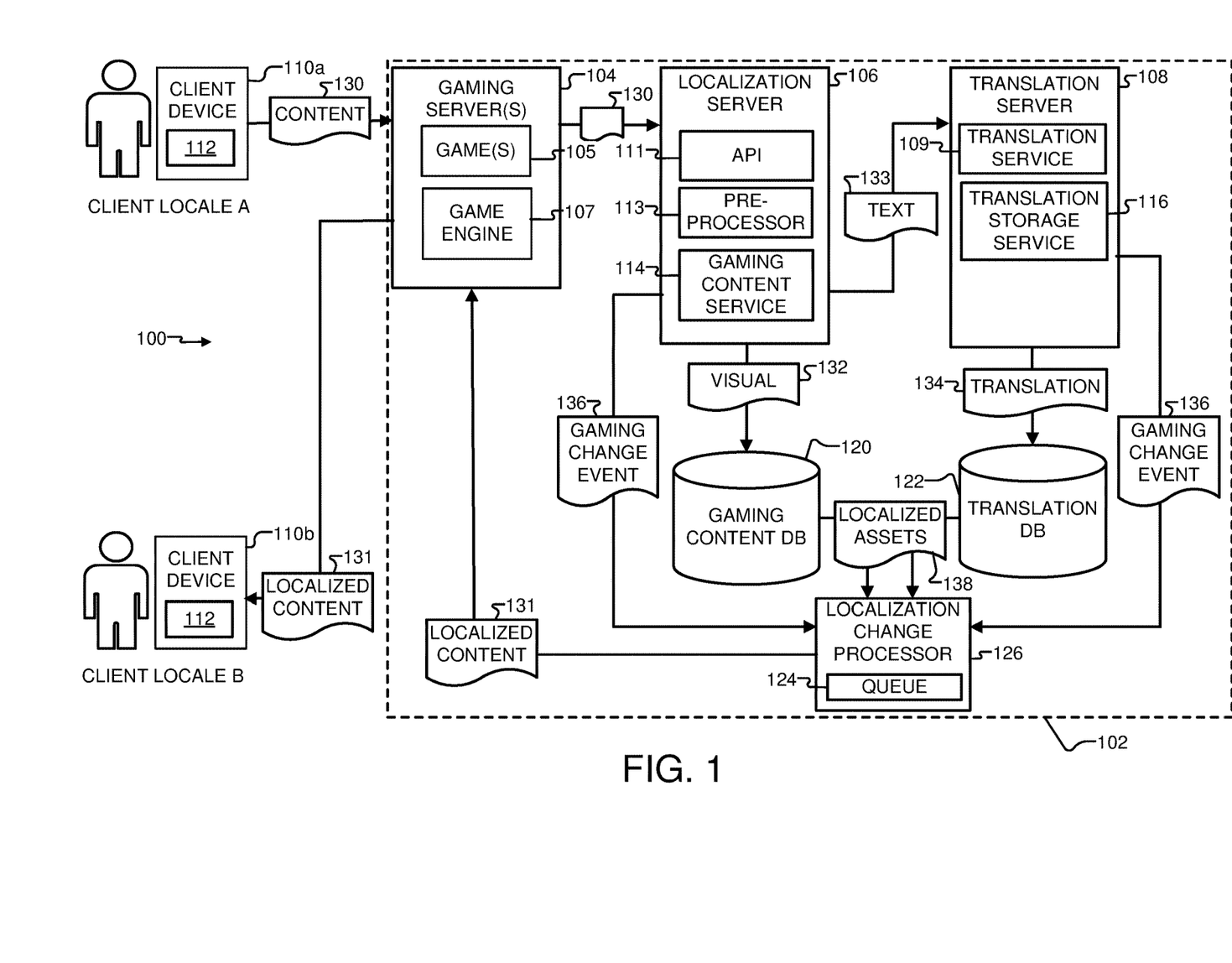
FIG. 1 is a diagram of an example system architecture for automatic localization of dynamic content, in accordance with some implementations.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming platform 102, and client devices 110a and 110b (generally referred to as "client device(s) 110" herein). The online gaming platform 102 and client devices 110 are coupled via a network or multiple networks.

Online gaming platform 102 can include, among other things, a gaming server 104, a localization server 106 (e.g., a dedicated localization server, or implemented within the gaming server(s) 104), a translation server 108 (e.g., a dedicated translation server, or implemented within the gaming server(s) 104), a translation service 109, a localization API 111, a preprocessor architecture 113, a gaming content service 114, a translation storage service 116, a localization change queue 124, a localization change processor 126 (e.g., a dedicated change server, or implemented within the gaming server(s) 104), a gaming content database 120, and a translation database 122. The gaming content database 120 and the translation database 122 may also be referred to as data stores. A client device 110 can include a gaming application 112, and input/output (I/O) interfaces (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, a network interconnecting various elements of the system architecture 100 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data stores 120 and 122 may be non-transitory computer readable memory (e.g., random access memory), a cache, a drive (e.g., a hard drive), a flash drive, a database system, or another type of component or device capable of storing data. The data stores 120 and 122 may also include multiple storage components (e.g., multiple drives or multiple databases) that may also span multiple computing devices (e.g., multiple server computers).

In some implementations, the online gaming platform 102 and associated components can include servers having one or more computing devices (e.g., a cloud computing system, a rackmount server, a server computer, cluster of physical servers, etc.).

In some implementations, the online gaming server 104 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 104 and to provide a user with access to online gaming server 104. In some implementations, the online gaming server 104 may be an independent system, may include multiple servers, or be part of another system or server.

The online gaming server 104 may also include a website (e.g., a webpage) or application back-end software that may be used to provide a user with access to content provided by online gaming server 104. For example, users may access online gaming server 104 using the game application 112 on client devices 110.

In some implementations, online gaming server 104 may be a type of social network providing connections between users or a type of user-generated content system that allows users (e.g., end-users or consumers) to communicate with other users on the online gaming server 104, where the communication may include voice chat (e.g., synchronous and/or asynchronous voice communication), video chat (e.g., synchronous and/or asynchronous video communication), text chat (e.g., synchronous and/or asynchronous text-based communication) and/or virtual reality/augmented reality chat (e.g., synchronous and/or asynchronous avatar-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 104 may be a virtual gaming server. For example, the gaming server may provide single-player or multiplayer games to a community of users that may access or interact with games using client devices 110 via a network. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game. In some implementations, a game may be played across multiple locales in multiple languages.

In some implementations, gameplay may refer to the interaction of one or more players using client devices (e.g., 110) within a game (e.g., 105) or the presentation of the interaction on a display or other output device of a client device 110.

In some implementations, a game 105 can include an electronic file that can be executed or loaded using software, firmware, or hardware configured to present the gaming content 130 (e.g., digital media item) and/or localized content 131 to an entity. In some implementations, a game application 112 may be executed and a game 105 rendered in connection with a game engine executing in cooperation with the game server 104. The rendering may include gaming content 130 that has been localized using localized assets 138. In some implementations, a game 105 may have a common set of rules or common goal, and the environment of a game share the common set of rules or common goal.

In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 112 may be collectively referred to a "world" or "gaming world" or "virtual world" or "universe" herein. An example of a world may be a 3D world of a game. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 104 can host one or more games 105 and can permit users to interact with the games 105 using a game application 112 of client devices 110. Users of the online gaming server 104 may play, create, interact with, or build games 105, communicate with other users, and/or create and build objects and content 130. For example, in generating user-generated content 130, users may create characters, decoration for the characters, one or more virtual environments for an interactive game, or build structures used in a game 105, among others. In some implementations, users may buy, sell, or trade game virtual game objects, such as in-platform currency (e.g., virtual currency), with other users of the online gaming server 104.

In some implementations, online gaming server 104 may transmit gaming content 130 to game applications (e.g., 112) rendered using localized assets 138. In some implementations, gaming content 130 (also referred to as "content" herein) may refer to any data or software instructions (e.g., game objects, game, user information, video, images, commands, media item, etc.) associated with online gaming server 104 or game applications. In some implementations, gaming content 130 may also refer to objects that are used, created, shared, or otherwise depicted through the online gaming server 104 or game applications 112 of the client devices 110. For example, content 130 may include a part, model, character, accessories, tools, weapons, clothing, buildings, vehicles, currency, flora, fauna, components of the aforementioned (e.g., windows of a building), and so forth. Localized assets 138 can include text or text data associated with a particular locale. Thus, when rendering gaming content 130, the online gaming platform 102 may provide localized game content using the localized assets 138 to render localized content 131.

It may be noted that the online gaming server 104 hosting games 105, is provided for purposes of illustration, rather than limitation. In some implementations, online gaming server 104 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users with access to the online gaming server 104 (e.g., a public game). In some implementations, where online gaming server 104 associates one or more games 105 with a specific user or group of users, online gaming server 104 may associated the specific user(s) with a game 105 using user account information (e.g., a user account identifier such as username and password).

In some implementations, online gaming server 104 or client devices 110 may include a game engine 107 and game application 112 provided localized content 131 that are localized through the online gaming platform 102. In some implementations, the game engine 107 may be used for the development or execution of games 105 including the localized content 131 and gaming content 130. For example, game engine 107 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 107 may generate commands that help compute and render the game 105 (e.g., rendering commands, collision commands, physics commands, etc.) including content 130 that is appropriately localized using localized assets 138. In some implementations, game applications 112 of client devices 110, may work independently, in collaboration with game engine 107, or a combination of both.

In some implementations, both the online gaming server 104 and client devices 110 may execute a game engine (107 and 112, respectively). The online gaming server 104 using game engine 107 may perform some or all the game engine functions (e.g., generate physics commands, rendering commands, etc.), or offload some or all the game engine functions to game engine 107 of client device 110. In some implementations, each game 105 may have a different ratio between the game engine functions that are performed on the online gaming server 104 and the game engine functions that are performed on the client devices 110. For example, the game engine 107 of the online gaming server 104 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 104 and client device 110 may be changed (e.g., dynamically) based on gameplay conditions. For example, if the number of users participating in gameplay of a particular game 105 exceeds a threshold number, the online gaming server 104 may perform one or more game engine functions that were previously performed by the client devices 110.

For example, users may be playing a game 105 on client devices 110, and may send control instructions (e.g., user inputs, such as right, left, up, down, user election, or character position and velocity information, etc.) to the online gaming server 104. Subsequent to receiving control instructions from the client devices 110, the online gaming server 104 may send gameplay instructions (e.g., position and velocity information of the characters participating in the group gameplay or commands, such as rendering commands, collision commands, etc.) to the client devices 110 based on control instructions. For instance, the online gaming server 104 may perform one or more logical operations (e.g., using game engine 107) on the control instructions to generate gameplay instruction(s) for the client devices 110. In other instances, online gaming server 104 may pass one or more or the control instructions from one client device 110 to other client devices (e.g., from client device 110a to client device 110b) participating in the game 105. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 104. In other implementations, the control instructions may be sent from a client device 110 to another client device (e.g., from client device 110a to client device 110b), where the other client device generates gameplay instructions using the game engine 107. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a client device 110 to render gameplay of a game 105, such as a multiplayer game, and content 130 or localized content 131. The gameplay instructions may include one or more of user input (e.g., control instructions), character position and velocity information, or commands (e.g., physics commands, rendering commands, collision commands, etc.). Localized content 131 may include translated text associated with the character to be rendered based on the gameplay instructions (e.g., position of text, etc.).

In some implementations, the online gaming server 104 may store content 130 created by users in the data store 120. In some implementations, the online gaming server 104 maintains a character catalog and game catalog that may be presented to users. In some implementations, the game catalog includes images of games stored on the online gaming server 104. In addition, a user may select a character (e.g., a character created by the user or other user) from the character catalog to participate in the chosen game. The character catalog includes images of characters stored on the online gaming server 104. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 104.

In some implementations, the client device(s) 110 may each include computing devices such as personal computers (PCs), mobile devices (e.g., laptops, mobile phones, smart phones, tablet computers, or netbook computers), network-connected televisions, gaming consoles, virtual reality (VR) devices, augmented reality (AR) devices, etc. In some implementations, a client device 110 may also be referred to as a "user device." In some implementations, one or more client devices 110 may connect to the online gaming server 104 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 104, such as control a virtual character in a virtual game hosted by online gaming server 104, or view or upload content 130, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 104. The game application may render, display, or present the content (e.g., a web page, a media viewer) to a user. In an implementation, the game application may also include an embedded media player (e.g., a Flash® player) that is embedded in a web page.

According to aspects of the disclosure, the game application 112 may be an online gaming server application for users to build, create, edit, upload content 130 to the online gaming server 104 as well as interact with online gaming server 104 (e.g., play games 105 hosted by online gaming server 104). As such, the game application may be provided to the client device(s) 110 by the online gaming server 104. In another example, the game application may be an application that is downloaded from a server.

In some implementations, a user may login to online gaming server 104 via the game application 112. The user may access a user account by providing user account information (e.g., username and password) where the user account is associated with one or more characters available to participate in one or more games 105 of online gaming server 104. In some implementations, with appropriate credentials, a game developer may obtain access to game virtual game objects, such as in-platform currency (e.g., virtual currency), avatars, special powers, accessories, and/or content 130 that are owned by or associated with other users.

In general, functions described in one implementation as being performed by the online gaming server 104 can also be performed by the client device(s) 110, or a server, in other implementations if appropriate. In addition, the functionality attributed to a particular component can be performed by different or multiple components operating together. The online gaming server 104 can also be accessed as a service provided to other systems or devices through appropriate application programming interfaces (APIs), and thus is not limited to use in websites.

In some implementations, online gaming server platform may include a gaming content service 114. In some implementations, the gaming content service 114 may be a system, application, or module that permits the online gaming server 104 to provide content 130 within the online gaming platform 102 for localization. In some implementations, the gaming content service 114 may perform one or more of the operations described below in connection with the flow charts shown in FIG. 4 and FIG. 5.

Generally, the gaming content service 114 is in operative communication with the gaming server 104 through localization API 111 and preprocessor architecture 113. The localization API 111 may be exposed to the gaming server 104 such that content 130 can be transmitted to the preprocessor architecture 113. In some implementations, the localization API 111 and preprocessor architecture 113 may be executed through the gaming server 104.

The preprocessor architecture 113 may convert the content 130 into a portion of gaming content that is visual content 132 and a portion of gaming content that is text content 133. The visual content 132 may also include text content in some implementations. For example, if the localization API 111 directs the preprocessor architecture to ignore translating a particular gaming content 130, the game content may be stored un-translated as visual content 132 in data store 120.

The gaming content service 114 may direct the visual content 132 to be associated with a gaming change event 136, in some implementations. The gaming change event 136 may be a trigger or event to engage display or renderings of a particular content 130. In other implementations, the gaming change event 136 may be omitted.

The gaming content service 114 may also direct text content 133 to translation service 109. The translation service 109 may include a machine translation service, a manual translation portal, or other translation components configured to translate at least a portion of the text content 133 into a translation 134. The translation 134 may be from a first language of a first locale (e.g., client locale A) into a second language associated with a second locale (e.g., client locale B). In some implementations, the translation 134 may be from the first language into a plurality of second languages associated with a plurality of locales.

The translation service 109 may apply any region-specific language protocols based on a particular locale. For example, child safety or child-appropriate-content guidelines, locale-specific slang guidelines, and/or other suitable guidelines may be formed into a protocol for translation service 109. The protocol may include content ratings that can block content based on a user context (e.g., a user's locale or region), a user profile (e.g., a user's age), and/or a user setting Thus, the translation service 109 may apply the protocol to ensure correct content is presented to users.

The translation 134 may be processed by translation storage service 116 and directed to be stored at data store 122. In some implementations, the translation 134 is also associated with the gaming change event 136. In other implementations, the gaming change event 136 may be omitted.

During execution of game 105, localization change queue 124 may take up instructions from gaming applications 112 to render content on client devices 110. In response to requests for content, the localization change queue 124 may retrieve localized assets 138. The localized assets 138 and content 130 may be processed by localization change processor 126 and rendered into the localized content 131. In some implementations, the gaming server 104 may localize content independently or in conjunction with the localization change processor 126.

Figure 2:
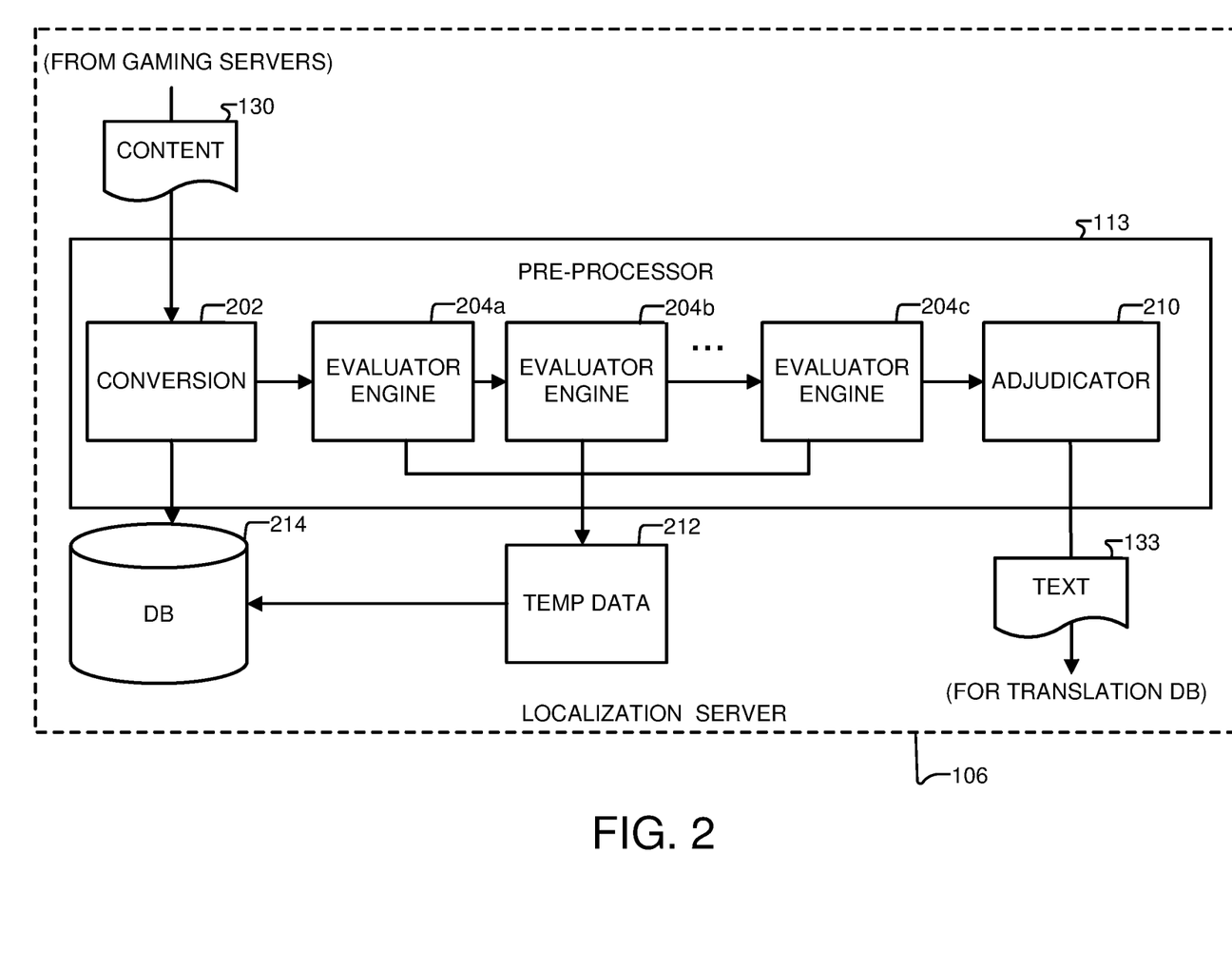
FIG. 2 is a diagram of an example preprocessor architecture, in accordance with some implementations.

FIG. 2 is a diagram of an example preprocessor architecture 113, in accordance with some implementations. In some implementations, the preprocessor architecture 113 may be a software service implemented and/or executed on the localization server 106, or another processing device. One or more sub-portions described in relation to the preprocessing architecture 113 may be implemented in hardware in some implementations.

In some implementations, the preprocessor architecture 113 may include a conversion module 202 configured to extract visual content 132 and text content 133 from gaming content 130. It is noted that the conversion module 202 may also control evaluation and transformation of the extracted visual content 132 and text content 133 such that processing of the same can be performed in any order. Additionally, the conversion module 202 may also direct translation into any suitable and/or separate processing pipeline, including serial or parallel processing architectures. The conversion may be utilized to store data in a data store 214.

Generally, the preprocessor architecture 113 includes a preprocessing pipeline formed through evaluator engines 204a, 204b, and 204c (generally referred to as evaluator engines 204 herein). The evaluator engines 204 are configured to identify various qualities of text such that only text that meets translation criteria is stored in the online gaming platform 102. Translation criteria may include, but is not limited to necessary content to progress in a game, necessary content to achieve a goal in a game, necessary content to advance in a game, necessary content to understand a content of a portion of a game, and other suitable criteria. For example, adjudicator 210 may evaluate text provided through evaluators 204 to determine whether gaming content 130 has been provided by an authorized source. Adjudicator 210 may also determine if the gaming content 130 is of importance to a game 105. For example, content that is specific to less than a threshold number of users (e.g., a user's pet's names), content that is less likely to be translatable (e.g., a secret code), ephemeral text (e.g., chat messages), other dynamic content, and/or other specific text may be determined to be unimportant. Generally, the evaluator engines 204 may run continuously and sort through temp data 212 to create any number of parsed strings of text. The parsed strings of text may be formed as database entries for storage in the online gaming platform 102.

In some implementations, the evaluators 204 are arranged to generate a pool of candidate database entries of text for storage in data store 122. The adjudicator 210 may be configured to select a subset of the candidate database entries to create a pool of remaining database entries. The adjudicator 210 may evaluate the entries in the pool of remaining database entries to generate an importance ranking and filter entries with an importance ranking that do not meet a first threshold. Entries that meet the first threshold are transmitted as text content 133 for translation and storage.

The first threshold of the importance ranking may be based on a number of indicators, including content-specific and/or platform-specific indicators. These indicators are combined into evaluator or transformation engines based on the strength of the indicators, e.g., determine a score based on a number of unique users saw the same content, based on game sessions and/or game instances that features the content, etc. Evaluators 204 may apply a weight to each indicator and determine some status for the evaluator itself, e.g., Approved, Inconclusive, Rejected, etc. The adjudicator 210 further combines the evaluator 204 responses to generate the value for the first threshold value.

In some implementations, the importance ranking value is a measure of an importance of textual data being accurately represented at a client locale, such as client locale B. In some implementations, the importance ranking value is based on a number of users that view the gaming content 130, a number of sessions associated with the gaming content 130, and a source of the gaming content 130.

In some implementations, the importance ranking value is based on a manual manipulation scheme of pre-configured or preset thresholds, such as game age (e.g., release date of a particular game), game popularity (e.g., higher thresholds to limit computing resources), player counts, and other suitable criteria. For example, a new game may have a smaller number of users that initial see the content of the game; correspondingly, a lower threshold may be selected for such a game. In another example, popular games may have a higher threshold set. Setting the threshold and/or weights for indicators may further be based on a percentage of player counts per game. Another indicator that may be used based on whether the developer associated with a game is a new developer (who has little or no prior content on the platform) or a known developer. The threshold and/or weights are selected such that automatic translation of game content can happen at a rate appropriate for the game. For example, if the game is gaining popularity, translation may be performed at a faster rate than other games by choosing appropriate values for the threshold and/or weight.

In some implementations, the importance ranking value is based on other factors and/or manual manipulation or machine training. Still further, in other implementations, the importance ranking value may be normalized such that a Boolean expression may be used to filter out poor candidate database entries prior to translation by the translation service 108.

Through the preprocessor architecture 113, gaming content 130 may be preprocessed to select good candidates (or equivalently, to remove poor candidates) for translation prior to processing by the gaming content service 114. Various forms of gaming content 130 may be processed for localization in the online gaming platform 102. The gaming content 130 can include visual data 132, text 133, and other data, as well. Upon translating at least a portion of the text 133, the online gaming platform 102 is capable of rendering localized content 131 for transmission to one or more client locales.

Figure 3:
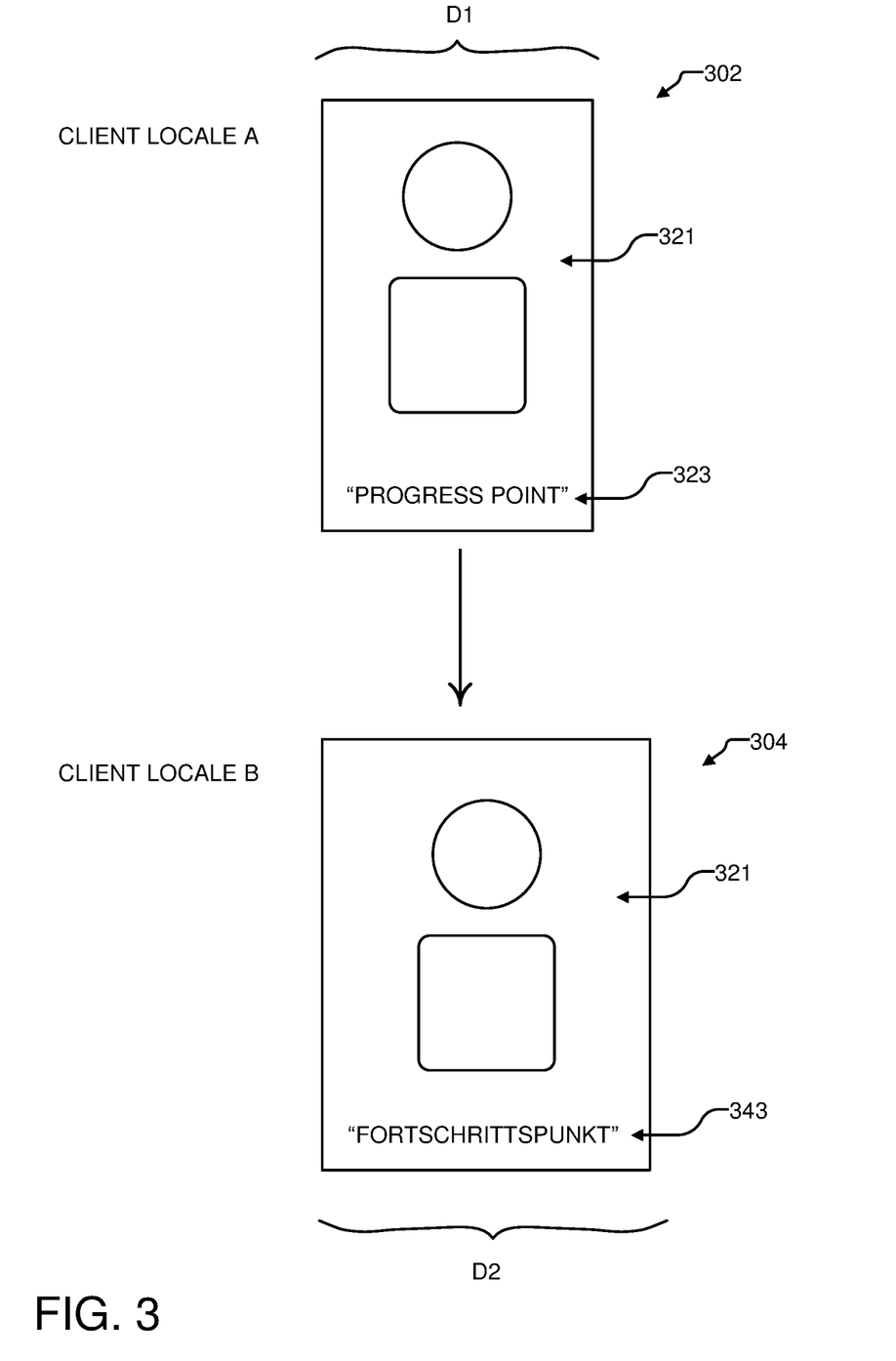
FIG. 3 is a diagram illustrating example gaming content and corresponding localized content, in accordance with some implementations.

FIG. 3 is a diagram illustrating example gaming content 302 and corresponding localized content 304, in accordance with some implementations. As shown in FIG. 3, gaming content 302 can include visual data 321 and text data 323. Furthermore, as the text data 323 in the gaming content 302 is in a first language, dimension D1 of the gaming content 302 may be associated with the linguistic characteristics of the first language.

Localized content 304 may also include the visual data 321 and translated text data 343. Furthermore, as the localized content 304 includes translated text data 343 in a second language, dimensions D2 of the localized content 304 may differ from D1 based on the linguistic characteristics of the second language. In the example shown in FIG. 3, D2 is larger than D3 to accommodate the translated text data 343 which is longer than the text data 323. Accordingly, as the online gaming platform 102 actively renders localized content 131 using localized assets 138 and gaming content 130, text data 343 may be accurately displayed at a second client locale regardless of differences in characteristics between the first language and the second language.

As seen in FIG. 2, localization may involve widening the outer rectangle until it is sufficient to fit the translated word. Other adjustments can include, e.g., selecting words that are closest to dimension D1 from available translations, autoscaling the text size (e.g., reducing or increasing the size, based on difference between the word length or width of the text data and the translated text data, word wrapping, text truncating, selecting a target font that matches the detected font/color/other visual aspect of the source text data (323) and/or fits dimension D1, performing a retargeting operation (e.g., that adjusts visual content taking into account content characteristics such as background vs. foreground, object identity, etc.), or a combination of these various techniques. In this manner, the online gaming platform 102 overcomes many technical deficiencies of on-the-fly translation such as poor positioning, text resizing, visibility, and other concerns. The specific adjustments that can be made when localizing content may be provided as options to a developer associated with the gaming content, such that the developer has control over the adjustments that are made when the gaming content is localized.

Hereinafter, methods of operations of the system architecture 100 including the online gaming platform 102 are described in detail with reference to FIG. 4 and FIG. 5.

Figure 4:
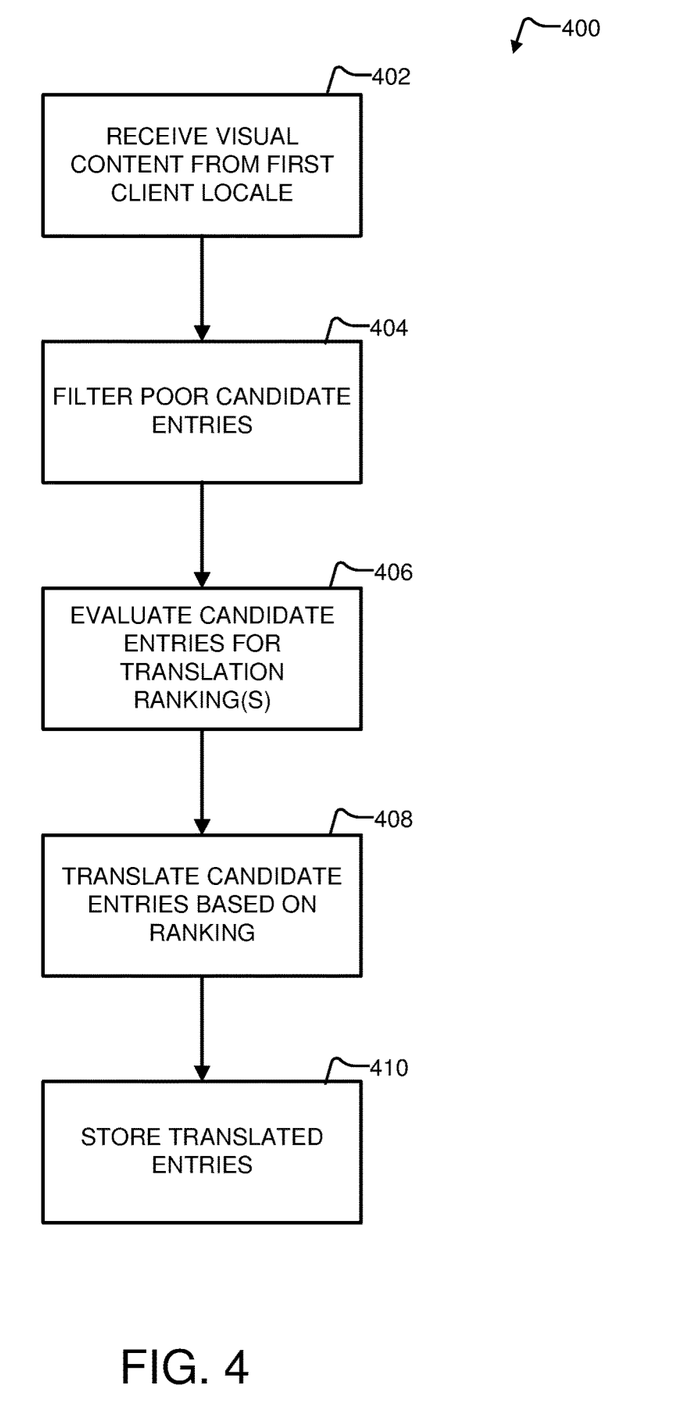
FIG. 4 is a flowchart illustrating an example method of automatic localization of dynamic content, in accordance with some implementations.
Figure 5:
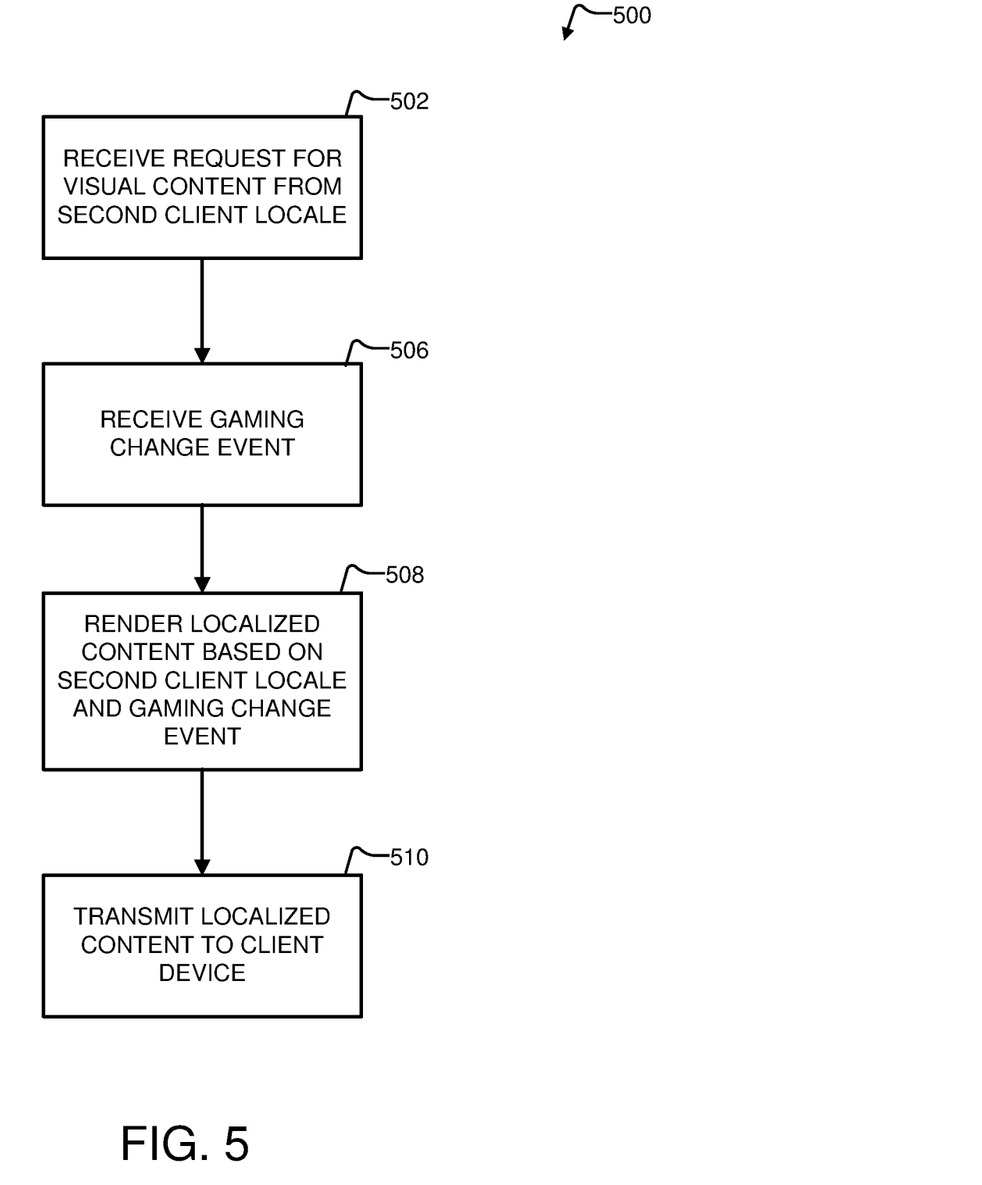
FIG. 5 is a flowchart illustrating another example method of automatic localization of dynamic content, in accordance with some implementations.

FIG. 4 is a flowchart illustrating an example method 400 of automatic localization of dynamic content, in accordance with some implementations. The method 400 begins at block 402. At block 402, visual content associated with a game from a first client locale is received. In some aspects, the visual content includes text being represented at the first client locale by a first language. Furthermore, the text may be partially represented by a first language, and partially represented by other languages. Accordingly, in different implementations, the entire text or a portion of the text less than the entire text may be processed as described below. Additionally, in accordance with other aspects, the text may be partially represented by proper use of the first language, and partially represented by colloquial or common parlance. Accordingly, the text may be further parsed to identify portions that may be omitted from a translation.

The received visual content (e.g., content 130 in FIG. 1) can be processed to identify any portions that contain the text. For example, in a game 105, the content 130 may include a signpost or building that includes text on one or more sides rendered thereon. The gaming content service 114 may identify and extract the text. In some implementations, a full copy of the received content may be stored at data store 120 for rapid service to the first client locale. In other implementations, a partial rendering of the content 130 absent some or all of the text may be stored at the data store 120.

In some implementations, the game 105 may include one or more game sessions. For example, the game engine 107 and/or game server 104 may allow for many sessions of the same game 105 with each session having its own environment (e.g., 5 players could together play a session of a pizza shop game, and a separate 3 players could play another session of the same game). The developer-provided content in both game sessions would be same, but the virtual avatars, user-generated content, and other content of the players would be specific, and the environment would develop differently, (e.g., the shops and pizza menus would be different) based on the actions by the respective players.

Additionally, a "locale" is associated with an individual user or client device 110, and within the same "game session" users will or should receive localized version of game content (e.g., if American and Brazilians and Germans are all in the same session, game content will be rendered in English, Portuguese, and German; or other such content localization). Accordingly, different content associated with different game sessions may also be processed and translated as described herein.

The received visual content may be content 130, including representative visual and text portions as described with reference to FIG. 1. The representative visual and text portions may also be separated through preprocessing. For example, the preprocessing architecture 113 may separate portions or the entirety of text prior to processing by the gaming content service 114. Furthermore, the preprocessing architecture 113 may perform other functions related to parsing, ranking, and filtering as described below. Block 402 may be followed by block 404.

At block 404, poor candidate entries are filtered. In some implementations, the preprocessing architecture 113 may preprocess the received visual content to create candidate database entries based on the text and the visual content. In some implementations, the candidate database entries represent the received content in the first language for storage in the data store 120. The candidate database entries may be organized according to any suitable organization scheme, including hashes of image data. The candidate database entries may be processed in the pipeline architecture illustrated in FIG. 2.

The preprocessing module 113 may further select a subset of the candidate database entries to create a pool of remaining database entries. The removal of the subset of candidate database entries may be effectuated through any filtering criteria.

According to some implementations, filtering criteria may include, but are not limited to, filtering based on: offensive content, colloquial content, euphemisms, exploitative content, content from blocked sources, content from unauthorized sources, content from new users or very newly created user accounts, and other suitable criteria. Block 404 may be followed by block 406.

At block 406, candidate entries are evaluated for translation rankings. In some implementations, evaluating entries can include evaluating entries in the pool of remaining database entries to generate a ranking.

In some implementations, the ranking is any suitable ranking by which to determine whether a particular portion of text should be translated. The ranking may be an importance ranking, a confidence ranking, an engagement ranking, or another suitable ranking. In some implementations, the importance ranking is a measure of importance that textual data is accurately represented at the second or other client locale. According to some implementations, the confidence ranking is a ranking that there is a level of necessity associated with translating the text. The level of necessity is representative of the confidence that the text is to be translated for localization. This is in comparison to portions of text associated with low or no confidence that text is to be translated. According to some implementations, the engagement ranking is a ranking that a candidate translation will result in further or increased engagement with a game 105 at the second or other locale.

Upon evaluating entries, the preprocessing architecture 113 may also implement filtering to remove entries from the pool of remaining database entries with a ranking (e.g., an importance ranking) that do not meet a first threshold. Generally, the first threshold may be chosen by game developers through analysis of analytics and metrics associated with engagement in the game 105 or other quality metrics. The first threshold may be altered throughout a play history of a particular game, and may differ depending upon the types or ages of users interacting with the game 105. Block 406 may be followed by block 408.

At block 408, the text is converted to generate translated text in at least a second language associated with a second client locale, at block 408. For example, the translation service 109 may translate some or all of the text at block 408. In some implementations, a game developer may translate or alter a translation through access of the online gaming platform 102.

In some implementations, only a portion of the text may be translated. The portion of the text to be translated may include portions of the text in proper grammar (e.g., if offensive or grammatically incorrect language is used), portions of the text in the first language (e.g., when multiple languages are used), and/or portions of the text otherwise ranked in importance. Block 408 may be followed by block 410.

At block 410 the translated text is stored in a database, the stored translated text being associated with the visual content. In some implementations, the translated text 134 is stored in translation database 122. In some implementations, the translated text is stored separately from the visual content 132. In this manner, computational and storage efficiency of the online gaming platform 102 is increased as compared to conventional systems storing full translations and rendered items in two or more languages.

Additionally, in some implementations, translation tables may be formed from strings of text translated in prior iterations of the method 400. For example, evaluators 204 may inspect data within database 214 to identify similar candidate text strings and perform splitting operations. Furthermore, evaluators 204 may also perform concatenation operations of other similar, but insufficient, strings. Additionally, some portions of text may be entirely ignored in some translation operations. Thus, a relatively compact translation table may be maintained. In these scenarios and implementations, portions of text may be retrieved from the translation table and concatenated to form fully translated phrases for rendering the localized content 131. In this manner, limited or reduced interaction with game developers is necessary, thereby effectuating a virtually fully automatic localization of games.

Utilizing the data stored in translation database 122, the online gaming platform 102 may rapidly process newly generated gaming content 130 through preprocessor 113, identify and filter text already associated with a translation, translate necessary text based on one or more rankings (e.g., importance, confidence, engagement), and associate visual content 132 with either a gaming change event or another aspect of a game 105. Thereafter, localized content may be rapidly and accurately rendered based on user requests from a second client locale, as described below.

While FIG. 4 shows 5 blocks 402-410, in different implementations, one or more of the blocks may be omitted, performed in parallel, or combined with other blocks. In some implementations, one or more of blocks 402-410 may be split into multiple blocks and/or additional blocks may be performed as part of the method. For example, in some implementations, block 406 may be omitted such that all entries that remain after the filtering and are translated.

Furthermore, blocks 402-410 can be performed (or repeated) in a different order than described above and/or one or more steps can be omitted. For example, block 406 may be performed multiple times, e.g., to evaluate multiple strings of text or multiple sub-strings of the same overall text string in creation of a compact translation table (e.g., within one or more gaming sessions). Additionally, block 408 may be performed multiple times, e.g., to translate multiple strings for creation of the compact translation table. In this manner, portions of method 400 may be repeated until all portions of a gaming session are appropriately translated or confirmed to be able to be translated through the translation table, using data stored in the platform. In some implementations, only subsets of text may be translated with some global content not being of significance to have text translated FIG. 5 is a flowchart illustrating an additional example method 500 of automatic localization of dynamic content, in accordance with some implementations. The method 500, similarly to the method 400, may be performed through the gaming content service 114 and/or other portions of the online gaming platform 102.

The method 500 may begin at block 502. At block 502, a request for visual content can be received from a second client locale. The request for visual content may be a request generated by a gaming application 112 on a client device 110. The request may include instructions related to a game 105 such that the gaming server 104 may identify one or more content stored in database 120. Block 506 may follow block 502.

At block 506, a gaming change event associated with the request may be received. It is noted that gaming change events may be omitted according to some implementations. However, if gaming change events are integrated, the gaming change events may be used to quickly locate gaming content from the databases 120 and 122 for localization.

As used herein, a gaming change event 136 may include any form of trigger event associated with rendering particular gaming content in a game 105. For example, and without limitation, trigger events can include movement of a character or avatar through a waypoint, completion of a side-quest or mini-game within an overall game, directional changes of a character or avatar in a game, acquisition of an item or content in a game, access of an in-game inventory or status screen in a game, manipulation of an object or content in a game, and other similar events in a game. Other trigger events can include, but are not limited to, purchase of an item within a game, trading of items within a game, opening a box or repository within a game, and other similar events in a game. Still further, trigger events can also include real-world interactions with a game, such as changing a character or avatar, exiting a game, resetting a game, and other similar events. It should be readily understood that the foregoing examples may not represent all forms of triggers and/or trigger events, and therefore should not be construed as an exhaustive list of all appropriate triggers.

Other triggers may be implemented by users, clients, and game developers without departing from the scope of this disclosure. Developers may also be provided with controls to control utilization of translations, e.g., via an API. For example, the API may enable a developer to make a call to obtain a translation of specific content. Block 508 may follow block 506.

At block 508, localized content may be rendered based on the second client locale and the gaming change event. In some implementations, when a gaming change event drives delivery of content to a client device, the localization change queue 124 may retrieve visual content 132 and translated text 134 to create localized assets 138. The localized assets 138 are based on the second client locale, language, and other client attributes associated with the request. Furthermore, the gaming change event 136 may determine an index in the databases 120 and 122 from which to rapidly retrieve localization data. Thereafter or at substantially the same time, the localization change processor may take localized assets 138 from the localization change queue and render localized content 131.

In some implementations, when a gaming change event does not drive delivery of localized content, the localization change processor 126 may utilize the received request for content and current game 105 to determine which visual content 132 to retrieve from database 120. Similarly, the second client locale may be used to determine which portion or portions of the stored translation tree from translation database 122 are necessary to render localized content 131. As such, the localization change processor 126 may render localized content 131 based on the received request for content. Block 510 may follow block 508.

At block 510, the localized content may be transmitted to a client device at the second client locale. The localization change processor may pass the localized content 131 to the gaming server 104 for distribution to one or more client devices. Furthermore, the localized content 131 may be localized to more than one locale, such that multiple locales are served appropriately localized content.

In some implementations, the game 105 may include one or more game sessions. For example, the game engine 107 and/or game server 104 may allow for many sessions of the same game 105 with each session having its own environment (e.g., 5 players could together play a session of a pizza shop game, and a separate 3 players could play another session of the same game). The developer-provided content in both game sessions would be same, but the virtual avatars, user-generated content, and other content of the players would be specific, and the environment would develop differently, (e.g., the shops and pizza menus would be different) based on the actions by the respective players.

Additionally, a "locale" is associated with an individual user or client device 110, and within the same "game session" users will or should receive localized version of game content (e.g., if American and Brazilians and Germans are all in the same session, game content will be rendered in English, Portuguese, and German; or other such content localization). Accordingly, different languages associated with different game sessions may also be processed and distributed as described herein.

Blocks 502-510 can be performed (or repeated) in a different order than described above and/or one or more steps can be omitted. For example, block 508 may be performed multiple times, e.g., to render multiple localized assets (e.g., within one or more gaming sessions). In this manner, portions of method 500 may be repeated until all portions of a gaming session are appropriately rendered for a client locale, using data stored in the platform. In some implementations, only subsets of assets may be localized with some global assets not being of significance to have text translated.

Figure 6:
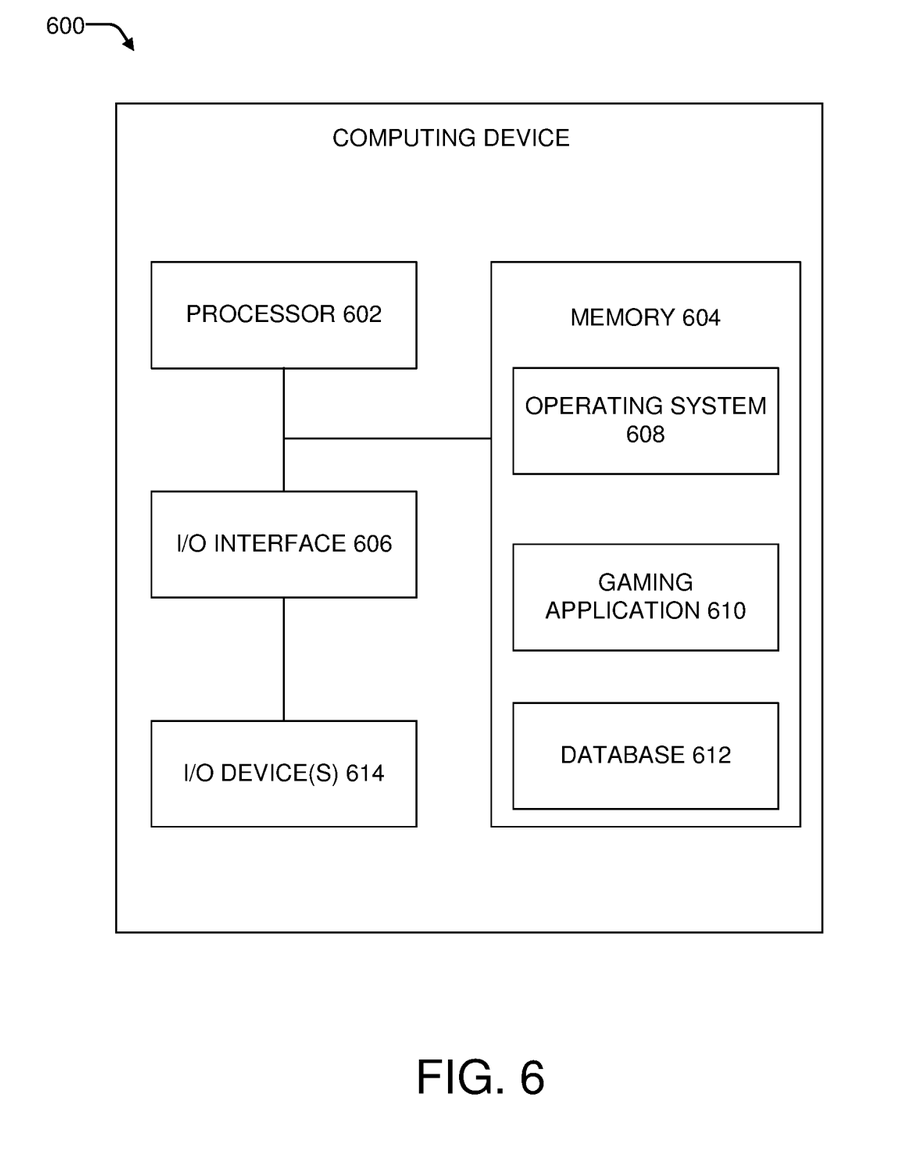
FIG. 6 is a block diagram illustrating an example computing device, in accordance with some implementations.

FIG. 6 is a block diagram of an example computing device 600 which may be used to implement one or more features described herein. In one example, device 600 may be used to implement a computer/client device (e.g. 110 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, one or more applications 610, e.g., a translation application and database 612. In some implementations, application 610 can include instructions that enable processor 602 to perform the functions (or control the functions of) described herein, e.g., some or all of the methods described with respect to FIG. 4 and FIG. 5.

For example, applications 610 can include a translation application and/or database module 612, which as described herein can provide localization of dynamic content for an online gaming content server (e.g., 104). Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 120, 122), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 614 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software engines. In other implementations, device 600 may not have all of the components shown and/or may have other elements including other types of elements instead of, or in addition to, those shown herein. While the online gaming server 104 is described as performing operations as described in some implementations herein, any suitable component or combination of components of online gaming server 104 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 400 and/or 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of automatic localization of dynamic content, the method comprising:
receiving visual content associated with a game from a first client locale, the visual content including text being represented at the first client locale by a first language and including visual data;
converting the text to generate translated text in at least a second language associated with a second client locale;
storing the translated text in a database in association with the visual content;
receiving a request for the visual content from a client device associated with the second client locale;
rendering localized content based on the second client locale, the localized content including the translated text and the visual data, wherein at least one adjustment is made to the translated text or to the visual data in the localized content; and
transmitting the localized content to the client device responsive to the request.

2. The computer-implemented method of claim 1, wherein the at least one adjustment includes one or more of: setting a dimension of the localized content to be different than a corresponding dimension of the visual content, selecting a particular translated text based on a dimension of the visual content, autoscaling text size of the translated text, selecting a target font for the translated text that matches a detected visual aspect of the text in the visual content, or performing a retargeting operation on the visual content.

3. The computer-implemented method of claim 1, wherein the converting comprises:
creating candidate database entries based on the text and the visual content;
selecting a subset of the candidate database entries to obtain a pool of remaining database entries;
evaluating entries in the pool of remaining database entries to generate an importance ranking; and
filtering to remove one or more entries from the pool of remaining database entries that are associated with a respective importance ranking that does not meet a first importance threshold.

4. The computer-implemented method of claim 3, wherein the first importance threshold is a value of importance of translated text being accurately represented at the second client locale.

5. The computer-implemented method of claim 1, wherein the converting comprises translating the text from the visual content into a plurality of languages, each language associated with a respective client locale, and wherein the storing comprises storing the translated text in the database, the stored translated text being associated with the respective client locale.

6. The computer-implemented method of claim 5, wherein the stored translated text is configured to be rendered in localized content and transmitted to client devices in the plurality of languages.

7. The computer-implemented method of claim 1, wherein the converting comprises:
creating candidate database entries based on the text and the visual content; and
selecting a subset of the candidate database entries based on context in which the text appears in the visual content.

8. The computer-implemented method of claim 7, wherein selecting the subset of candidate database entries comprises removing candidate database entries associated with an invalid source of the visual content.

9. The computer-implemented method of claim 1, wherein the translated text is associated with an importance ranking value that meets a first importance threshold.

10. The computer-implemented method of claim 9, wherein the importance ranking value is a measure of importance of translated text being accurately represented at the second client locale.

11. The computer-implemented method of claim 10, wherein the importance ranking value is based on one or more of a number of users that view the visual content, a number of sessions associated with the visual content, or a source of the visual content.

12. The computer-implemented method of claim 1, wherein the text is user-generated text provided by a user that accesses the game.

13. A computer-implemented method of automatic localization of dynamic content, the method comprising:
receiving visual content associated with a game from a first client locale, the visual content including text being represented at the first client locale by a first language and including visual data;
converting at least a portion of the text to generate translated text in a second language associated with a second client locale;
receiving a request for the visual content from a client device in the second client locale;
rendering localized content based on the second client locale and a gaming change event, the localized content including the translated text and the visual data, wherein at least one adjustment is made to the translated text or to the visual data in the localized content; and
transmitting the localized content to a client device at the second client locale.

14. The computer-implemented method of claim 13, wherein converting the portion of the text includes converting a subset of the text that meets a threshold confidence value.

15. The computer-implemented method of claim 13, wherein the converting comprises:
creating a pool of candidate database entries;
evaluating entries in the pool of candidate database entries to generate an engagement score; and
filtering to remove one or more entries with engagement scores that does not meet a first threshold.

16. The computer-implemented method of claim 15, wherein the engagement score is a measure of user interaction with the translated text.

17. The computer-implemented method of claim 13, wherein the converting comprises translating the portion of the text separately from the visual content.

18. The computer-implemented method of claim 17, wherein the translated text is stored separately from the visual content.

19. The computer-implemented method of claim 13, wherein the converting comprises selecting a subset of candidate database entries prior to generating the translated text.

20. The computer-implemented method of claim 19, wherein selecting the subset of candidate database entries comprises removing candidate database entries associated with offensive content.

21. A system comprising:
a memory with instructions stored thereon; and
a processing device, coupled to the memory, the processing device configured to access the memory and execute the instructions, wherein the instructions cause the processing device to perform operations including:
receiving visual content associated with a game from a first client locale, the visual content including text being represented at the first client locale by a first language and including visual data;
converting at least a portion of the text to generate translated text in a second language associated with a second client locale;
receiving a request for the visual content from a client device in the second client locale;
rendering localized content based on the second client locale and a gaming change event, the localized content including the translated text and the visual data, wherein at least one adjustment is made to the translated text or to the visual data in the localized content; and
transmitting the localized content to a client device at the second client locale.

22. A non-transitory computer-readable medium with instructions stored thereon that, responsive to execution by a processing device, causes the processing device to perform operations comprising:
receiving visual content associated with a game from a first client locale, the visual content including text being represented at the first client locale by a first language and including visual data;
converting the text to generate translated text in at least a second language associated with a second client locale;

storing the translated text in a database in association with the visual content;

receiving a request for the visual content from a client device associated with the second client locale;

rendering localized content based on the second client locale, the localized content including the translated text and the visual data, wherein at least one adjustment is made to the translated text or to the visual data in the localized content; and transmitting the localized content to the client device responsive to the request.

23. The non-transitory computer-readable medium of claim 22, wherein the at least one adjustment includes one or more of: setting a dimension of the localized content to be different than a corresponding dimension of the visual content, selecting a particular translated text based on a dimension of the visual content, autoscaling text size of the translated text, selecting a target font for the translated text that matches a detected visual aspect of the text in the visual content, or performing a retargeting operation on the visual content.

\* \* \* \* \*